Patented Aug. 24, 1937

2,091,106

UNITED STATES PATENT OFFICE 2,091,106

COMPOUNDS OF THE DIMETHYLOLUREA-ETHYLENE - OXIDE CONDENSATION-PRODUCT SERIES

Henry Alfred Piggott, Cheadle Hulme, England, assignor to Imperial Chemical Industries Limited, a corporation of Great Britain No Drawing. Original application February 8, 1934, Serial No. 710,387. Divided and this application June 4, 1935, Serial No. 24,989. In Great Britain February 15, 1933

15 Claims. (Cl. 260—99.12)

This application is a division of my co-pending application Serial No. 710,387, filed February 8, 1934.

The invention herein described relates to chemical compounds, which are valuable textile assistants, and a process for the manufacture thereof. It further relates to the preparation of improved treatment baths comprising a treatment liquid to which the new chemical compounds have been added. It further relates to the preparation of improved treatment baths for the dyeing with vat dyes and chrome blacks.

Ordinary soaps are of little value for use in acidic baths, since the alkali metal salts are converted to the insoluble fatty acids. Moreover, heavy metal or alkaline earth metal salts of higher fatty acids are relatively insoluble in aqueous solutions. Hence, where hard water containing salts of magnesium, calcium, and the like is used in aqueous treatment baths, and soap is added thereto, a relatively large proportion of the soap may be precipitated.

It is an object of the present invention to produce new chemical compounds. A further object is to produce new chemical compounds which are valuable detergent agents. A still further object is the production of new chemical compounds which are valuable dispersing agents, wetting-out agents, emulsifying agents, softening agents or vat-retarding agents. Other objects will appear hereinafter.

These objects are accomplished by producing chemical compositions by the process which comprises interacting a dialkylol urea with an alkylene oxide. The chemical compounds obtainable in this way may be converted to further new chemical compositions by treating them with a substance chosen from the group which comprises alkylating agents and esterifying agents. As the latter, organic or inorganic esterifying agents may be employed. For instance, by selecting an esterifying agent which introduces into the molecule a long-chain aliphatic acid radical, a product having pronounced soap-like characteristics may be obtained. By the use of an agent introducing a sulfuric ester group, the water solubility of the compound may be increased. A preferred alkylene oxide is ethylene oxide. Preferred dialkylol ureas are those in which the alkylol groups are of a short-chain. The interaction of the dialkylol urea and alkylene oxide may be effected by heating, which may be without a catalyst and even without a diluting medium, heating being effected when necessary in a closed vessel.

While the invention is susceptible of considerable variation and modification in the manner of its practical application, particularly as regards the specific materials used, the proportion thereof and the method of their preparation, the following examples, in which the parts are by weight, will serve to illustrate some of the products falling within the invention and how they may be prepared.

Example 1

25 parts of dimethylolurea and 120 parts of ethylene oxide are heated together in a closed vessel by raising the temperature to 120° C. uniformly during 5 hours, and then keeping at this temperature until the internal pressure falls to zero. A pale brown viscous liquid, readily soluble in water to a colorless solution is obtained.

Example 2

A mixture of 7.5 parts of the product of Example 1, 2 parts of lauryl chloride ($C_{11}H_{23}COCl$), and 1.5 parts of triethylamine is heated at 60° C. for 15 minutes and then at 100° C. for a further 15 minutes. On cooling a pale-brown semi-solid mass is obtained, which dissolves with great readiness in cold water; it is a powerful wetting-out agent and also possesses scouring properties.

Example 3

In a similar manner, by taking the product of Example 1 with twice its weight of 10% oleum for 30 minutes at 40–45° C. a sulfuric ester is formed. This is readily soluble in both soft and hard water, and forms a water-soluble barium salt.

As many apparently widely different embodiments of this invention may be made without departing from the spirit and scope thereof, it is to be understood that I do not limit myself to the specific embodiments thereof except as defined in the following claims.

I claim:

1. In a process for producing textile assistants, the step which comprises condensing a lower dialkylol urea with an alkylene oxide, the proportion of the alkylene oxide being sufficient to furnish a plurality of alkylene oxide radicals for each OH group of the dialkylol urea.

2. A process as in claim 1 including further the step of reacting the intermediate product thus obtained with an esterifying agent.

3. A process as in claim 1 including further the step of reacting the intermediate product thus obtained with an agent adapted to convert it into a sulfuric ester.

4. A process as in claim 1 including further the step of reacting the intermediate product thus obtained with an agent adapted to convert it into an ester of a higher aliphatic acid.

5. The process of producing a water-soluble textile assistant, which comprises heating dimethylol urea with an excess of ethylene oxide in a closed vessel, whereby to effect condensation between the two reactants.

6. The process which comprises heating substantially 25 parts of dimethylol urea with about 120 parts of ethylene oxide, in a closed vessel at about 120° C., until the pressure has subsided, and recovering the reaction product.

7. A process as in claim 6 followed by the further step of heating the reaction product with an esterifying agent whereby to convert the same into an ester.

8. A process as in claim 6 followed by the step of heating the reaction product with lauric acid chloride in the presence of a tertiary base, to produce the lauric acid ester thereof.

9. A process as in claim 6 followed by the step of heating the reaction product with 10% oleum to produce a sulfuric acid ester thereof.

10. The compounds obtainable by the process defined in claim 1.

11. The compounds obtainable by reacting with esterifying agents upon the condensation product obtainable in claim 1.

12. The compounds obtainable by the process defined in claim 6.

13. The compounds obtainable by esterifying with lauric acid chloride the dimethylol-urea-ethylene-oxide condensation product produced in claim 6.

14. The compounds obtainable by esterifying with 10% oleum the dimethylol-urea-ethylene-oxide condensation product produced in claim 6.

15. A water-soluble compound of the series obtainable by reacting dimethylol urea with an excess of alkylene oxide and converting the reaction product into an ester.

HENRY ALFRED PIGGOTT.